Aug. 16, 1949. S. B. MARTIN 2,479,075
SCREW LOCKING MEANS
Filed Nov. 24, 1944
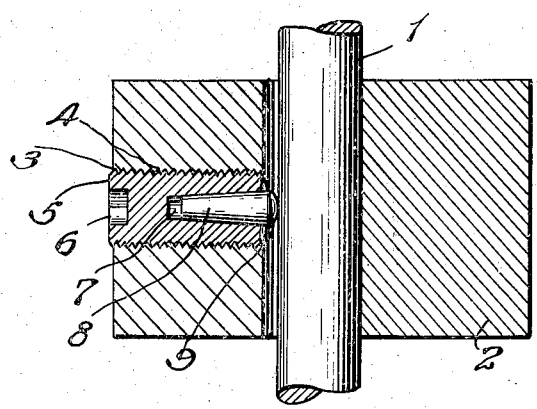
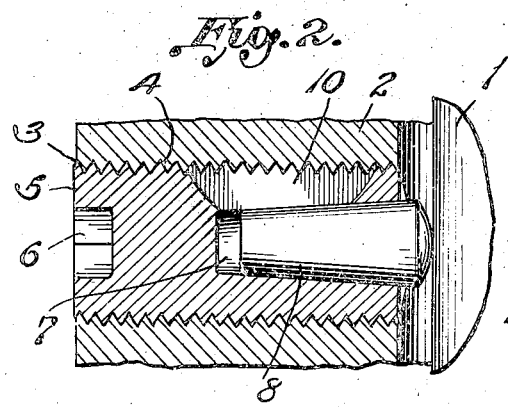
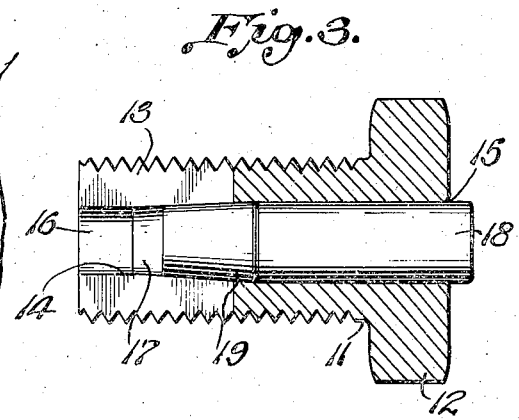
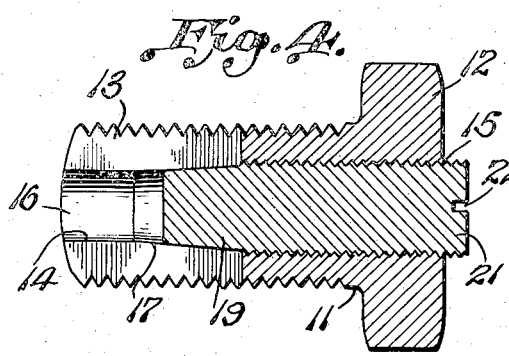
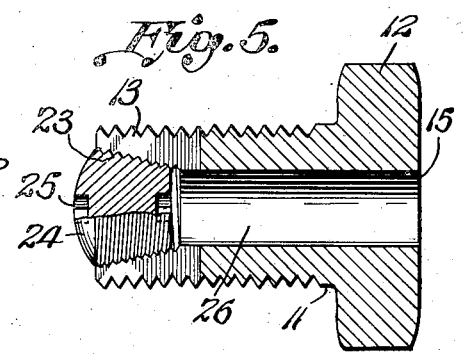
INVENTOR.
STODDARD B. MARTIN
BY
Richey Watts
ATTORNEYS Patented Aug. 16, 1949

2,479,075

UNITED STATES PATENT OFFICE 2,479,075

SCREW LOCKING MEANS

Stoddard B. Martin, Cleveland, Ohio; Central National Bank of Cleveland, executor of said Stoddard B. Martin, deceased, assignor to Margaret J. Martin Application November 24, 1944, Serial No. 564,918

3 Claims. (Cl. 151—32)

The principal object of this invention is to prevent accidental loosening or separation of interengaging threads, while permitting intentional separation and re-engagement of the threaded members in the usual manner.

Another object of this invention is to automatically lock threaded members such as set screws, cap screws, and the like by merely tightening them in place in the usual manner. Other objects and advantages will appear hereinafter.

In the accompanying drawings, which illustrate preferred embodiments of the invention:

Fig. 1 is a longitudinal section of a shaft assembly illustrating the improved set screw locking means;

Fig. 2 is an enlarged fragmentary longitudinal section of a slightly modified form;

Fig. 3 is a longitudinal section of a further modification;

Fig. 4 is a longitudinal section of another modification; and

Fig. 5 is a longitudinal section of a different modification.

Broadly speaking, my invention consists in providing means to expand the threaded portion of a set screw or the like to take up the clearance and exert a radial pressure between the screw and the cooperating threaded member, so that the frictional resistance of the screw to turning is sufficient to prevent accidental loosening.

In the embodiment shown in Fig. 1, a shaft 1 extends through a hole in a member 2, which may be the hub of a wheel or the like to be carried by the shaft, or a support to which the shaft is to be secured. For clarity, an exaggerated clearance is shown between the shaft 1 and the hole in the member 2.

The member 2 is formed with a radial bore 3 which is tapped, as shown at 4, to receive a set screw 5. Suitable provision is made to permit the set screw 5 to be engaged by a tool, such as the hexagonal socket 6 to receive the end of a wrench.

The set screw 5 is formed with a tapered hole 7 extending into the same from its inner end and receiving a correspoidingly tapered plug 8. The larger end 9 of the plug is preferably convex, projects beyond the inner end of the set screw 5 to engage the surface of the shaft 1. The taper of the hole 7 and the plug 8 is less than the angle of repose between the materials of the screw 5 and the plug 8, and is preferably about three degrees. With this arrangement, when the plug 8 is forced into the hole 7, the friction produced by the radial component of the reaction force is greater than the axial component of such force, so that the plug remains in any position in the hole 7 into which it is pressed.

In the manufacture of screw threaded articles it is necessary to provide for a slight clearance between the nominal sizes of the cooperating parts because of manufacturing tolerances. Set screws 5 are made in the usual manner with a clearance between the nominal dimensions and with the actual dimensions varying through the usual tolerance range. The tapered holes 7 are then formed in the set screws 5 and the plugs 8 inserted and driven lightly into firm engagement with the walls of the holes 7. Because of the angle of the taper of the holes 7 and the plugs 8 the plugs remain in position so that the set screws can be sold and handled in the same manner as though they were integral one piece units of the usual type.

When the set screw 5 is screwed into member 2 with which it is to be used the projecting end 9 of the plug 8 contacts the shaft 1 when the screw is tightened into place. Further tightening of the screw forces the plug 8 farther into the hole 7, stretching and expanding the material of the screw 5 so as to take up all clearance between the screw and the tapped hole. The screw is tightened down until the rounded end 9 of the plug 8 engages the shaft 1 with sufficient pressure to firmly lock the member 2 to the shaft 1. During this tightening the plug 8 expands the material of the screw 5 until a radial pressure is exerted by the screw against the tapped hole in the member 2, the movement of the plug 8 into the hole 7 being resisted first by the tensile strength of the screw 5 itself, and finally by the tensile strength of the member 2 after the desired pressure has been developed between the screw 5 and the tapped hole 3 in the member 2. The amount of pressure which the screw exerts against the tapped opening 3 may be predetermined by varying the angle of taper of the hole 7 and plug 8.

After the screw has been seated so as to lock the member 2 with respect to the shaft 1, the friction resulting from the radial pressure of the screw 5 in the hole 3 locks the screw against accidental dislodgement. However, the screw may be readily removed intentionally by means of a wrench or other tool when desired. After removal the plug 8 remains in the position in the hole 7 to which it was pressed when the screw was initially tightened. The screw 5 can then be readily replaced in the same tapped hole from which it was removed by simply turning it into place with a wrench against the friction between the threads. Thus after once having been seated in place the screw has a perfect fit in its particular opening.

When it is desired to provide for a greater amount of expansion of the screw 5, as for example, when it is desired to allow a greater tolerance between the nominal diameters of the screws and the tapped openings, or where the screws are made of material of unusually high tensile strength, one or more slots 10 may be cut through the wall of the screw into the hole 7, as illustrated in Fig. 2. In this embodiment the slots 10 do not extend to the open end of the hole 7, so that the entering end of the screw 5 remains a solid annulus. The operation is the same as described above, except that a smaller part of the radial force created by the plug 8 is utilized in stretching the metal of the screw 5 and thus a greater part is exerted directly against the tapped opening 3.

A different arrangement of the invention, more particularly suitable for cap screws or bolts, is illustrated in Fig. 3. In this embodiment the screw 11 is formed with an enlarged head 12 which may be hexagonal or of other suitable forms. The inner screw threaded end of the set screw is slotted diametrically as illustrated at 13.

There is a central or axial bore 14 running from end to end of the screw. At the head end of the screw the bore has an enlarged cylindrical form 15. The inner end of the bore has a smaller diameter 16. There is an intermediate conical or tapered portion 17 connecting the large bore 15 to the smaller bore 16. The taper 17 begins near the point represented by the inner end of the slot 13. There is however a substantial portion of the threaded end of the screw represented by the lesser diameter or bore 16.

A plug 18 fits in the bore to expand the screw at the portion represented by the taper 17. This plug has a generally cylindrical main portion which terminates at the inner end with a conical taper 19, corresponding to the tapering inner bore 17. The plug 18 is of sufficient length that the taper 19 fits into the taper 17 while the rear end of the plug 18 is at or beyond the end surface of the head 12.

As in the embodiments previously described the bore 17 and the portion 19 taper at an angle less than the angle of repose between the materials of the screw 11 and the plug 18; or in other words, at an angle less than the angle whose tangent is equal to the coefficient of friction between the plug and the screw. Thus after the screw is formed the plug 18 may be driven lightly into position and the friction between the tapers 17 and 19 retains the plug in place until the screw is ready to be used.

After the screw has been tightened into its cooperating threaded member, which may be the tapped hole 3 of the member 2, or any other type of tapped member or nut, the threads may be locked by striking the projecting end of the plug 18 with a hammer. This action causes the tapered portion 19 of the plug to expand the portion of the threaded shank containing the taper 17 so that this portion of the screw exerts a radial compressive force against the cooperating threaded member and creates sufficient friction to lock the parts together against accidental dislodgement. As in the embodiment previously described, the threads may be intentionally separated by the application of a wrench or other suitable tool, and after having been once tightened the plug 18 remains in position so that the screw has a perfect fit with its cooperating threaded member and may be intentionally removed and replaced whenever desired.

It is not necessary to rely solely upon driving the plug into the bore and relying on the frictional engagement between the tapers 17 and 19. Thus Fig. 4 illustrates carrying out this effect by screw threading the inner plug. As shown in this figure the large bore 15 is screw threaded and plug 21 has a similar screw thread over its larger diameter. The rear end of the plug 21 is slotted as at 22.

In this instance the plug is screwed into the set screw until the taper 19 applies compression against the taper 17 resulting in the expansion of the latter into locking engagement. In other respects the operation of the two forms is similar.

In the event that it is desirable, the expansion of the slotted end of the screw can be accomplished from the inner or threaded end of the screw. Thus, in Figure 5 I have shown the screw 11 to have a uniform cylindrical axial bore 15. The inner or threaded end of the screw is slotted at 13. This end is also tapered or more properly flared toward the end of the screw as shown at 23. This tapered portion is screw threaded. It is sometimes desirable to make this a left-handed thread for greater locking effectiveness. The plug 24 has a corresponding screw threaded taper. Sockets 25 and 26 are provided in the opposite ends of the plug 24 so that a socket wrench or similar tool may be utilized.

In this modification of the invention, the plug 24 is held loosely in the slotted end of the screw until the latter has been brought up tightly. The plug is then screwed into the taper by means of a tool. This tool may be applied either through the central bore 15 of the screw or alternatively at the large end of the plug 24. In either event the plug serves to spread the end of the screw and lock it into fixed position.

Each of the embodiments illustrated in Figs. 3, 4 and 5 may be used as a set screw, for example, in the tapped opening 3 of the member 2 illustrated in Figs. 1 and 2. When so used it will be noted that in each of these embodiments, as in the embodiments of Figs. 1 and 2, the portion of the threaded shank which is expanded is at least partially within the cooperating threaded member, so that the effect of the expansion is to take up the clearance between the threads and establish a radial pressure therebetween, rather than to distort any part of the screw in such a manner that it will not enter the cooperating threaded member. Similarly each of the embodiments of the invention may be used in other cooperating threaded members such as nuts and sockets of various types.

It will be evident that the invention can be carried out in a variety of ways. Numerous changes in minor details in construction and material are possible. The invention is therefore to be considered as limited only by the scope of the following claims.

I claim:

1. A locking screw having a screw threaded shank adapted to be screwed into a cooperating threaded device, said shank having an axial bore opening through the leading end thereof, said bore including a tapering portion within at least a part of the portion of said threaded shank adapted to fit within the cooperating threaded device, the leading end of said shank around said bore being circumferentially continuous, and a member fitting in the tapered portion of said bore and adapted to be moved therein to expand said shank, the taper of said bore being less than the angle of repose between said member and said shank.

2. A locking screw having a screw threaded shank adapted to be screwed into a cooperating threaded device and into engagement with a transverse abutment at the leading end thereof, said shank having an axial bore opening through the leading end thereof, said bore including a tapering portion within at least a part of the portion of said threaded shank adapted to fit within the cooperating threaded device, the leading end of said shank around said bore being circumferentially continuous, and a member proportioned to extend beyond the end face of the shank fitting in the tapered portion of said bore and adapted to be moved longitudinally therein by engagement with said transverse abutment to stretch and expand the circumferentially continuous portion of said shank, the taper of said bore being less than the angle of repose between said member and said shank.

3. A screw comprising a threaded shank, the leading end part of said shank being circumferentially continuous, said part having a centrally located circular bore open to the leading end face of the screw, said bore having a taper with the large diameter of the taper adjacent said end face and a tapered plug carried within said bore, said plug shaped to fit said bore with the large diameter of the plug adjacent said end face, said plug proportioned to extend beyond said face and being movable longitudinally of the bore to stretch and expand said circumferentially continuous part, the diameter variation in the taper of the bore and the corresponding diameter variation in the plug effecting a frictional self locking between the plug and shank.

STODDARD B. MARTIN.

REFERENCES CITED

The following references are of record in the file of this patent:

UNITED STATES PATENTS

| Number | Name | Date |
|---|---|---|
| 1,220,024 | Tanzi | Mar. 20, 1917 |
| 1,223,412 | Murdoch et al. | Apr. 24, 1917 |
| 1,225,468 | Minnis | May 8, 1917 |
| 1,310,213 | Rixson | July 15, 1919 |
| 1,372,291 | Jacobs | Mar. 22, 1921 |
| 1,438,648 | Jacobs | Dec. 12, 1922 |
| 1,630,499 | Ross | May 31, 1927 |
| 2,180,030 | Bugatti | Nov. 14, 1939 |
| 2,181,103 | Davis | Nov. 21, 1939 |

FOREIGN PATENTS

| Number | Country | Date |
|---|---|---|
| 545,411 | France | July 20, 1922 |
| 22,938 | Great Britain | Dec. 15, 1900 |